E. M. HASBROUCK.
ERASER FOR BLACKBOARDS, &c.
APPLICATION FILED FEB. 8, 1912.

1,034,706.

Patented Aug. 6, 1912.

Witnesses
A. C. Blakeny
A. R. Fowler

Inventor
E. M. Hasbrouck
By
A. L. Hough
Attorney

UNITED STATES PATENT OFFICE.

EDWIN M. HASBROUCK, OF WASHINGTON, DISTRICT OF COLUMBIA.

ERASER FOR BLACKBOARDS, &c.

1,034,706.  Specification of Letters Patent. Patented Aug. 6, 1912.

Application filed February 8, 1912. Serial No. 676,453.

*To all whom it may concern:*

Be it known that I, EDWIN M. HASBROUCK, a citizen of the United States, residing at Washington, in the District of Columbia, have invented certain new and useful Improvements in Erasers for Blackboards, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dustless blackboard erasers, comprising a device having a suitable holder and made up of a series of strips of felt or other material.

The invention comprises various details of construction and combinations and arrangements of parts which will be hereinafter fully described, shown in the accompanying drawings and then specifically defined in the appended claim.

I illustrate my invention in the accompanying drawings, in which:—

Figure 1:
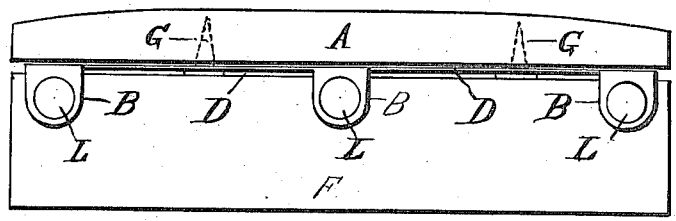
Figure 2:
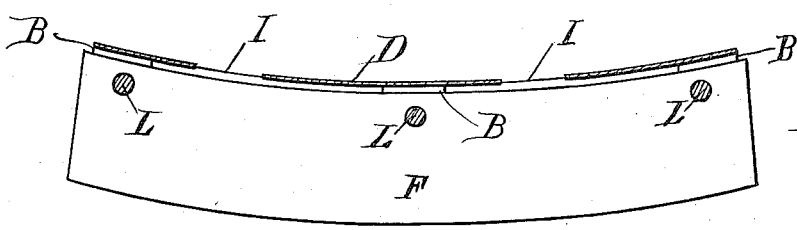
Figure 3:
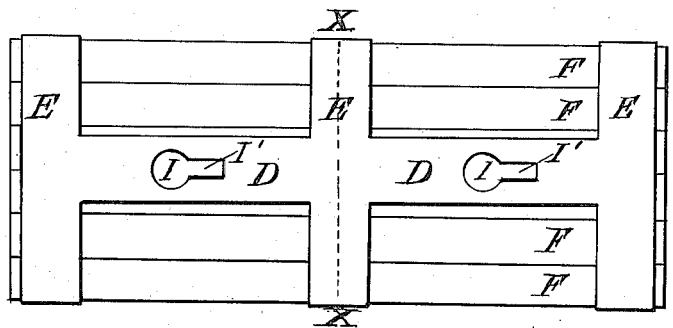
Figure 4:
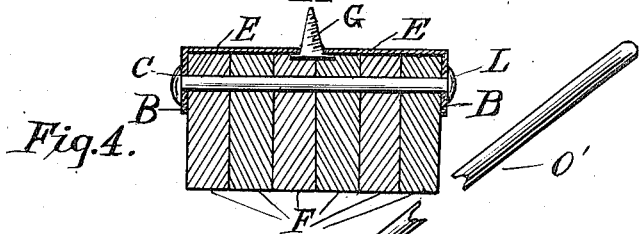

Figure 1 is a side elevation of the device. Fig. 2 is a view in elevation of the metallic frame which carries the strips of felt with the handle removed. Fig. 3 is a top plan view of the metallic frame to which the strips of felt are fastened. Fig. 4 is a cross sectional view on line x+x of Fig. 3, and Fig. 5 is a detail perspective view of a modification of the invention showing the application of the invention for use as a scrub brush.

Reference now being had to the details of the drawings by letter, A designates a handle made of wood or other material and to the under surface of said handle are fastened screws G, each having a head, said screws being preferably fastened to the under surface of the handle along the longitudinal center of the handle. A metallic frame, designated by letter D, is provided with laterally projecting fingers E, the ends of which are bent at right angles, as at B, and are apertured as at C for the reception of the rivets or bolts L. Said frame has circular-outlined openings I, from each of which leads a slot I', as shown in Fig. 3 of the drawings. A series of strips of felt, designated by letter F, have apertures formed therein and are mounted upon the bolts or rivets in the manner shown in the drawings, and said strips are preferably saturated with a chemical substance to which the dust will cling.

Upon reference to Fig. 2 of the drawings, it will be noted that the frame D preferably bows slightly and is made of a resilient material so that, when the parts are adjusted together in the manner shown in Fig. 1 of the drawings, the friction intermediate the adjacent faces of the frame and the handle will serve to prevent the accidental loosening of the parts when adjusted together.

Figure 5:
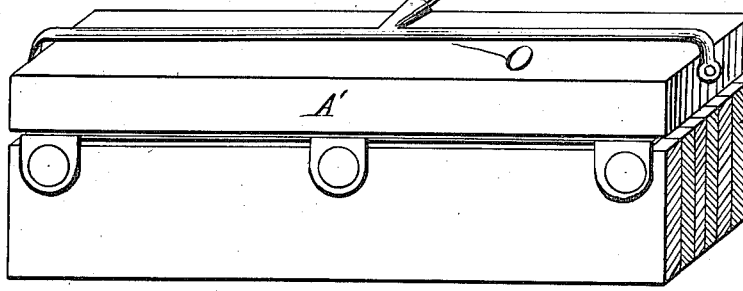

In Fig. 5 of the drawings, I have shown a slight modification of my invention in which I have illustrated a bail O which is fastened to the block A', said bail being provided with a socket member for the reception of the handle O', thus affording means whereby the device may be used as a floor cleaner, scrub brush or mop.

It will be noted that in adjusting the parts together, the bowed frame D is pressed against the under surface of the handle A and the heads of the screws inserted through the openings I and the handle A given a longitudinal movement independent of the frame in order to bring the shank portions of the screws into the slots I', thus securely holding the parts together.

By the provision of an eraser or scrubbing device made in accordance with my invention, means is afforded whereby the dust incident to using chalk upon a blackboard or dust upon a floor may be absorbed by the felt which has been previously treated with a suitable chemical or other substance and, when desired, the frame with the felt strips may be detached from the handle and thoroughly washed and used repeatedly.

What I claim to be new is:—

A dustless blackboard eraser comprising a resilient plate bowed its entire length and provided with slots, each having a corresponding widened end, said plate having laterally and oppositely projecting wings which have angled ends with registering apertures therein, a series of strips of felt intermediate said angled ends, pins passing through said registering apertures and having upset ends, tending to hold the angled ends in clamping relation with said series of strips, a handle having its under surface flat with headed screws projecting therefrom and adapted to engage the slots in the resilient plate and hold the same parallel with the flat surface of the handle, as set forth.

In testimony whereof I hereunto affix my signature in the presence of two witnesses.

EDWIN M. HASBROUCK.

Witnesses:
 ISAAC R. HILL,
 A. L. HOUGH.